(12) United States Patent
Lingafelt et al.

(10) Patent No.: US 7,702,731 B2
(45) Date of Patent: Apr. 20, 2010

(54) SYSTEM, METHOD AND PROGRAM FOR FACILITATING AN ELECTRONIC CHAT SESSION

(75) Inventors: Charles Steven Lingafelt, Durham, NC (US); John Christopher Scott, The Woodlands, TX (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 11/505,507

(22) Filed: Aug. 17, 2006

(65) Prior Publication Data
US 2008/0046515 A1 Feb. 21, 2008

(51) Int. Cl.
G06F 15/16 (2006.01)
(52) U.S. Cl. .......................... 709/205; 715/234; 707/3; 709/207; 709/223
(58) Field of Classification Search ................. 709/205, 709/207, 223; 707/3; 715/234
See application file for complete search history.

(56) References Cited

U.S. PATENT DOCUMENTS

| | | | |
|---|---|---|---|
| 7,363,295 B2 * | 4/2008 | Szeto et al. ..................... 707/3 |
| 7,487,441 B2 * | 2/2009 | Szeto .......................... 715/234 |
| 2001/0047305 A1 | 11/2001 | Bowen, Jr. .................... 705/26 |
| 2004/0179039 A1 | 9/2004 | Blattner et al. ............... 345/758 |
| 2004/0199621 A1 * | 10/2004 | Lau ............................. 709/223 |
| 2005/0114783 A1 | 5/2005 | Szeto .......................... 715/747 |
| 2005/0204309 A1 | 9/2005 | Szeto |
| 2005/0234883 A1 | 10/2005 | Szeto et al. |
| 2005/0234885 A1 | 10/2005 | Szeto et al. .................... 707/3 |

* cited by examiner

Primary Examiner—Wing F Chan
Assistant Examiner—Ruolei Zong
(74) Attorney, Agent, or Firm—Arthur J. Samodovitz

(57) ABSTRACT

Computer system, method and program product for facilitating a chat session. An icon or a definition of the icon and a corresponding intelligent agent program are received at a workstation. In response, the workstation displays the icon in a chat session window. A selection of the icon is received during the chat session. In response, the workstation invokes the intelligent agent program. In response, the intelligent agent program obtains information about the workstation or information about a participant in the chat session at the workstation and automatically renders the information in the chat session at the workstation. In response to a request to send the rendered information to other participants in the chat session at other workstations, the rendered information is automatically sent to the other participants in the chat session at the other workstations.

20 Claims, 8 Drawing Sheets

SYSTEM, METHOD AND PROGRAM FOR FACILITATING AN ELECTRONIC CHAT SESSION

FIELD OF THE INVENTION

The present invention relates generally to computer systems and the Internet, and more specifically to electronic chat sessions.

BACKGROUND OF THE INVENTION

Chat sessions, such as provided by Microsoft Instant Messenger program, IBM SameTime program, Microsoft MSN Messenger program, Microsoft Windows Messenger program, Yahoo Instant Messenger program, and AOL Instant Messenger program, are well known today. Typically, a person at a client workstation initiates the chat session by invoking his or her chat session client program and identifying one or more other people to participate in the chat session. The person can identify the other people to participate in the chat session by accessing a directory, selecting individuals from a predefined list of people or selecting a predefined group of people. Then the person requests that his or her client computer send to a server the identifications (such as e-mail addresses) of the people to participate in the chat session. In response, a chat session server program tries to connect to the client workstations of the other people selected to participate in the chat session to determine if the other people are currently on-line. For any of the client workstations of these other people that are currently on-line, the server creates the chat session by invoking their respective chat session client program and identifying all the active members of the chat session. For any of the client workstations of these other people that are not currently on-line, the server notifies the originator that such people are not available for a chat session at this time. Next, any of the members of the chat session can type a message into a message text field on their client workstation, and then "send" the message. In response, the respective chat session client program sends the message to the server, and the server sends it to the other participants in the chat session. In some implementations of chat client programs, communication between clients is done on a peer to peer level, i.e. directly from client workstation to client workstation without mediation by or assistance from a server program. In either implementation, the effect is the same and there is the appearance that the clients are communicating directly to each other in the chat sessions. In response to a chat session message, the client workstations that receive the message will display the message, along with the identity of the sender. In the same manner, other participants can subsequently type a new message at their respective client workstation, and that new message along with the identity of the sender appears on the client workstations of the other workstations, nearly in real time.

A MessageLAN program was previously known to facilitate entry of text into a message text field of a chat session, as follows. The MessageLAN program provides icons or buttons in the chat session window, and if a user selects the icon or button, the MessageLAN program automatically enters predefined text, corresponding to the icon or button, in the message text field of the chat session window. (The text was predefined by the creator of the corresponding icon or button.) Then, the user can select to "send" the text in the message text field, and in response, the chat session client workstation will send this text to the other workstations (typically via a chat session server) in the same manner as if the user manually typed the text into the message text field.

A Lotus Notes electronic mail program was previously known. With this program, a user can define an icon or button and corresponding text for a predefined location of an e-mail, such as a signature block at the end of an e-mail. Subsequently, if the user selects the icon or button, the Lotus Notes electronic mail program automatically enters the corresponding text at the predefined location of the e-mail.

An object of the present invention is to facilitate entry of messages in a chat session.

SUMMARY OF THE INVENTION

The present invention resides in a computer system, method and program product for facilitating a chat session. An icon or a definition of the icon and a corresponding intelligent agent program are received at a workstation. In response, the workstation displays the icon in a chat session window. A selection of the icon is received during the chat session. In response, the workstation invokes the intelligent agent program. In response, the intelligent agent program obtains information about the workstation or information about a participant in the chat session at the workstation and automatically renders the information in the chat session at the workstation. In response to a request to send the rendered information to other participants in the chat session at other workstations, the rendered information is automatically sent to the other participants in the chat session at the other workstations.

According to a feature of the present invention, another participant at another of the workstations defined the icon and the intelligent agent program and sent the icon or a definition of the icon and the intelligent agent program to the first said workstation.

DETAILED DESCRIPTION OF THE PREFERRED EMBODIMENTS

Figure 1:
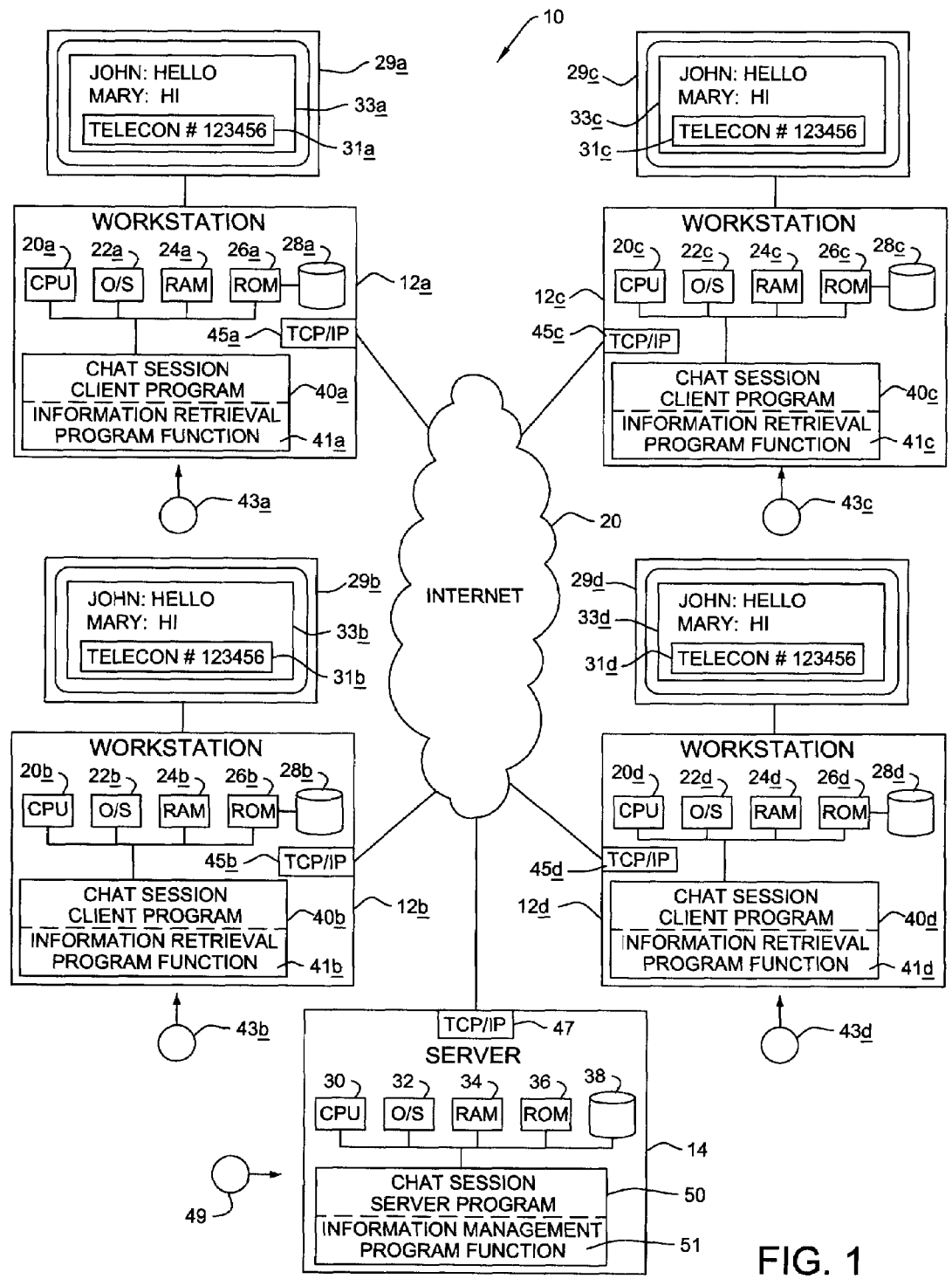
FIG. 1 is a block diagram of a distributed computer system, including client workstations with respective chat session client programs and a server computer with a chat session server program, which incorporates the present invention.

The present invention will now be described in detail with reference to the figures. FIG. 1 illustrates a distributed computer system generally designated 10. Distributed computer system 10 comprises workstations 12a,b,c,d and a server 14 interconnected via the Internet 20. The workstations 12a,b, c,d include respective CPUs 20a,b,c,d, operating systems 22a,b,c,d, RAMs 24a,b,c,d, ROMs 26a,b,c,d, storages 28a,b,c,d, and monitors 29a,b,c,d according to the prior art. Workstations 12a,b,c,d also include respective chat session client programs 40a,b,c,d with known functions to initiate and participate in a chat session via a chat session server program 50 in server 14. Each chat session is displayed in a respective chat session window 33a,b,c,d with text fields. In addition, each of the chat session client programs 40a,b,c,d includes a respective information retrieval program function 41a,b,c,d according to the present invention which enables each participant in the chat session to send a (static or intelligent) agent program and associated information retrieval icon or button to (the workstation of) each other participant in the chat session and receive such an information retrieval icon or button and corresponding agent program from (the workstation of) the other participants. FIG. 1 illustrates an example of such buttons 31a,b,c,d when displayed in chat session windows 33a,b,c,d. The information retrieval icon or button at each workstation will appear in the chat session window adjacent to the text. If the participant that receives the icon subsequently selects the information retrieval icon or button in the chat session, the associated agent will automatically enter information into the text field of the chat session of the participant as if such participant manually typed the information into the text field of his or her chat session window. In one embodiment of the agent program, the agent program is statically programmed with this information before the agent program is sent to the other participants, either when the agent program is coded or when a participant sends the agent to the other participants. Thus, the static agent and associated information retrieval icon or button facilitate the retrieval of this information and its entry into the text field of the chat session of the participant who receives and then selects the icon or button. After the participant selects the icon or button and the static agent automatically enters the resultant information in the participant's text field, and the participant selects the "send" command, this information will be sent to the other participants where the information will appear in their text fields of their chat sessions, prefaced by the name of the participant which sent the information.

In another embodiment of the intelligent agent, the agent is "intelligent" and programmed to dynamically fetch predefined types of information from the workstation of the participant that receives it when such participant selects the corresponding icon and thereby invokes the intelligent agent. For example, the intelligent agent can be programmed to query and fetch BIOS or other computer hardware or software configuration information of such participant when such participant selects the corresponding icon and invokes the intelligent agent. The BIOS and other computer hardware and software information is stored in configuration files of the workstation of such participant. As another example, the intelligent agent can be programmed to automatically fetch the URL of a web page currently displayed on the screen of such participant and enter the URL into the message field of such participant, when such participant selects the corresponding icon. As another example, the intelligent agent can be programmed to query information about such participant, such as such participant's work address or a teleconference telephone number and access code that are stored in a profile in the workstation of such participant. In these last examples, the intelligent agent could enter the following text into the text field of the chat session of such participant after fetching the work address and teleconference number from such participant's profile: "My work address is 200 Main Street, Springfield, N.Y." or "The call-in number for the telecom is (555) 123-4567 and the access code is 2468." When such participant subsequently presses the "send" button (after the intelligent agent enters the information in the text field of such participant), these messages will be sent to the other participants in the chat session, into the text fields of their chat sessions (either via the chat session server 14 or directly from the workstation of such other participants). Thus, the intelligent agent and associated information retrieval icon or button facilitate the retrieval of this information and its entry into the text field of the chat session of the participant who receives and then selects the icon or button. After the participant selects the icon or button and the intelligent agent automatically enters the resultant information in the participant's text field, and the participant selects the "send" command, this information will be sent to the other participants where the information will appear in their text fields of their chat sessions, prefaced by the name of the participant which sent the information.

Chat session server 14 includes a CPU 30, operating system 32, RAM 34, ROM 36 and storage 38, according to the prior art. Server also includes chat session server program 50 with a known chat session server function to establish a chat session with two or more participants upon request by one participant and forward chat session messages created by one participant to the other participants. Chat session server program 50 also includes an information management program function 51 according to the present invention to forward an agent and associated icon or button from one participant to the other participants in the chat session. (Alternately, the chat session server program 50 can maintain a predefined set of icons or buttons and associated agents for chat sessions, and supply them to any client upon request.) As explained above, the chat session client programs will then initiate display of the icon or button in the respective chat session windows of their respective workstations, and invoke and execute the agent when a participant at the respective workstation selects the icon or button. The agent will then automatically enter predetermined ("static") information into the text field of the chat session or dynamically fetch information from the workstation of the participant and automatically enter the fetched information into the text field of the chat session.

Figure 2A:
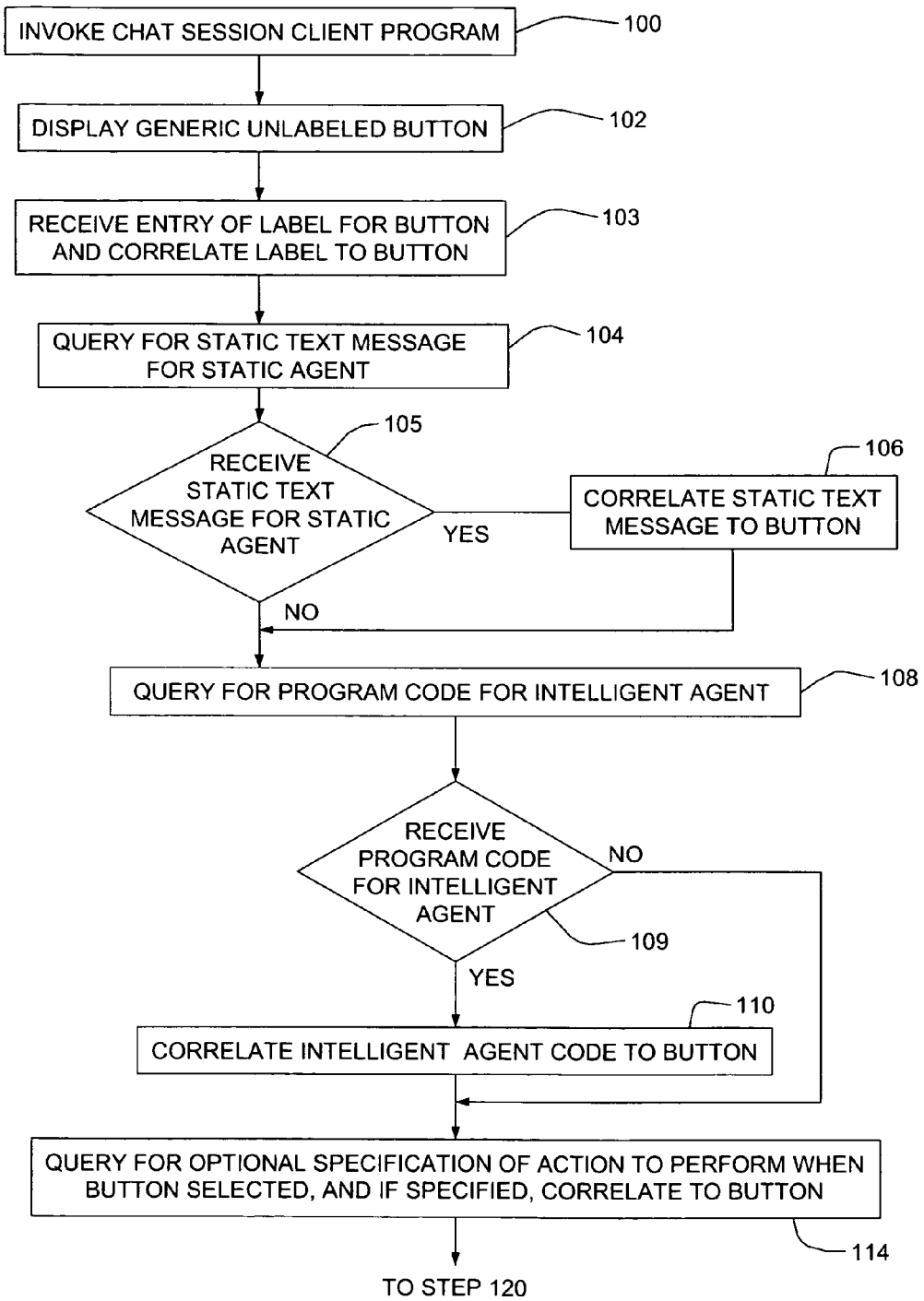
FIGS. 2(A-B) form a flow chart of operation of the chat session client programs of FIG. 1 to create and publish information retrieval buttons and corresponding agents.
Figure 2B:
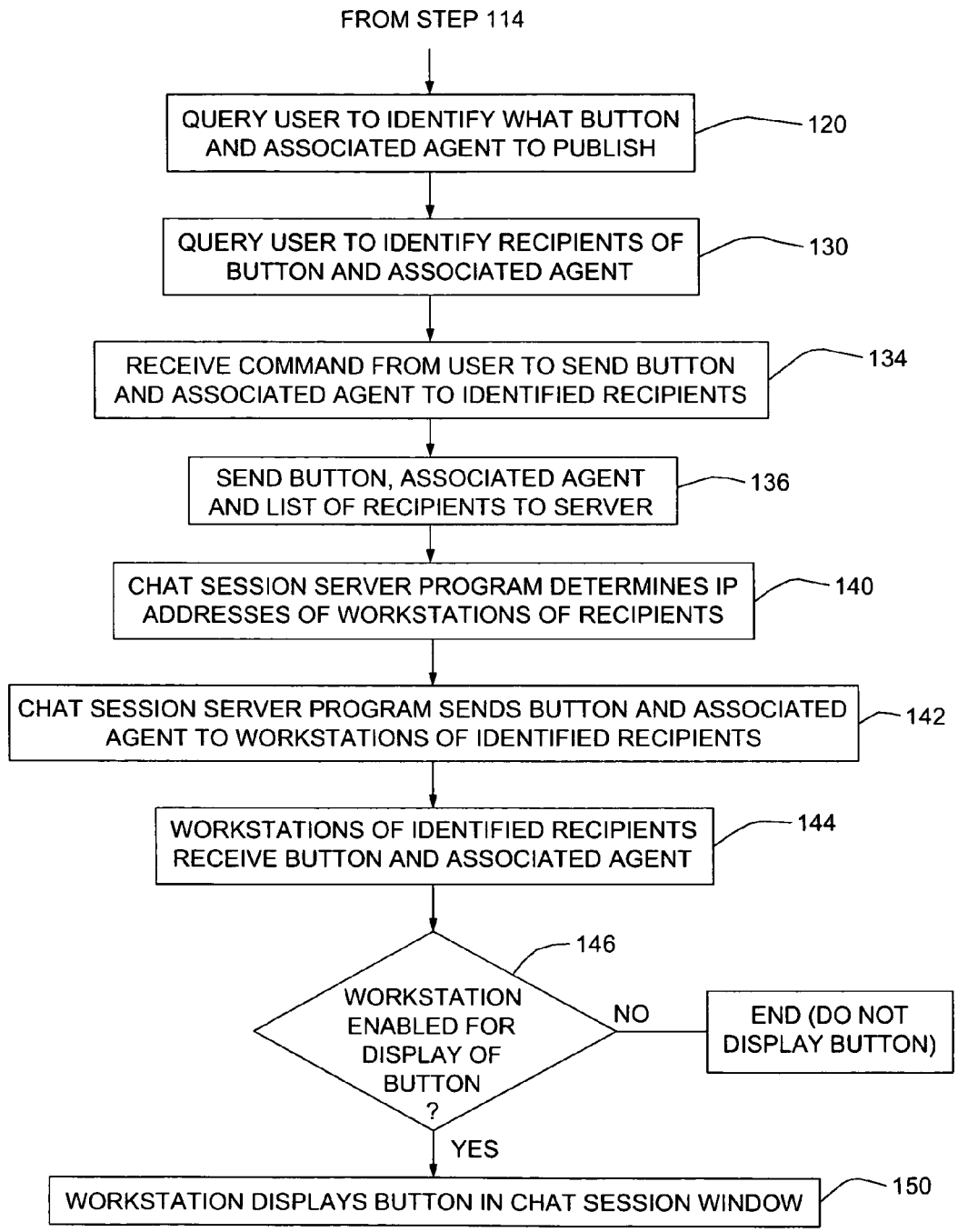

FIGS. 2(A-B) form a flow chart of a set-up and publication phase of the agents and associated icons or buttons. In step 100, a user at one of the workstations 12a,b,c,d, for example workstation 12a, invokes his or her chat session client program 40a and selects the information retrieval program function 41a. In response, the information retrieval program function 41a displays a button (icon) and queries the user to enter a label for the button (step 102) and program function 41a correlates the label provided by the user to the button (step 103). Next, the information retrieval program function 41a queries the user to define a message to be carried by a static agent program and displayed in the recipients' chat session window when the recipient selects the button and invokes the static agent program (step 104). If so (decision 105, yes branch), then the program function 41a correlates the static agent program with the button (step 106). By way of example, the message can be The Help Desk's Number is 1-800-123-4567 or URL: www.ibm.com/support. The user may define an intelligent agent program in addition to the text message (after step 106), or in lieu of the text message (decision 105, no branch). So, the information retrieval program function 41a will next query the user to define program code for the intelligent agent program that will execute in the recipients' workstation when the recipient selects the button (step 108). If the user defines such program code (decision 109, yes branch), then program function 41a correlates the intelligent agent with the button (step 110). By way of example, the intelligent agent program code can fetch BIOS or other computer hardware or software information from the recipient's workstation or information from a profile of the recipient such as a telephone number, work address, teleconference phone number and access code, etc. Optionally, the user can also specify an action to occur when the recipient selects the corresponding button (step 114). Examples of possible actions are as follows: send a "wake-up" notification message to an application, begin encryption of this session and log a user's actions. The foregoing steps 100-114 typically occur before establishment of a chat session that will display the button.

The following steps can occur before or during establishment of the chat session that will display the button. After the user entered all information needed to define the button and associated message for the static agent or the program code for the intelligent agent in steps 100-114, the information retrieval program function 41a queries the user to confirm which button to "publish" or send to other people (step 120). To facilitate step 120, the information retrieval program function displays a list of buttons previously defined by the user, and queries the user to select one. Next, the information retrieval program function 41a queries the user to specify the recipients of the button and associated static agent or intelligent agent (step 130). If step 130 occurs before establishment of the chat session that will use the button, then the user can specify the people to receive the button and associated agent by (a) entering their e-mail address(es), (b) accessing a directory of employees and selecting from the directory, (c) selecting from a predefined "buddy list", or (d) selecting a predefined group of recipients. If step 130 occurs during the chat session that will use the button, then the user can specify the people to receive the button and associated agent by (a) entering their e-mail address(es), (b) accessing a directory of employees and selecting from the directory, (c) selecting from a predefined "buddy list", (d) selecting a predefined group of recipients, (e) selecting an "all participants" of the current chat session option or (f) selecting some of the participants of the current chat session. Next, the user selects an option to send the button and associated agent to each of the people specified in step 130 (step 134). In response, workstation 12a sends the button and associated agent to the server 14 along with the identities of the people specified in step 130 (the "specified recipients") to receive them (step 136). In response, the chat session server program 50 determines from a domain name server, the IP addresses of the workstations of the specified recipients (step 140) and sends them the button and associated agent program (step 142). Each of the specified recipients, for example, at workstations 12b,d,d receives the button and associated agent program (step 144). If the respective chat session client programs at the recipient's workstations have been enabled for display of the button (decision 146, yes branch), then the respective chat session client program information retrieval program 41b,c,d,e displays the button (step 150). A recipient can enable his or her workstation for display of such buttons by invoking his or her chat session client program information retrieval program function and selecting an "enable for display of information retrieval buttons" option. The recipient can so enable his or her workstation either before or during a chat session. In the latter case, if a button is received during a chat session, it will automatically be displayed and activated in near real time in the window of the chat session.

In an alternate embodiment of the present invention where there is no intermediary server such as server 14 to manage the chat session, then the person who defines the button and associated agent in steps 100 to 114 can send them directly to the recipients specified in step 130 without going through an intermediary server.

Figure 3A:
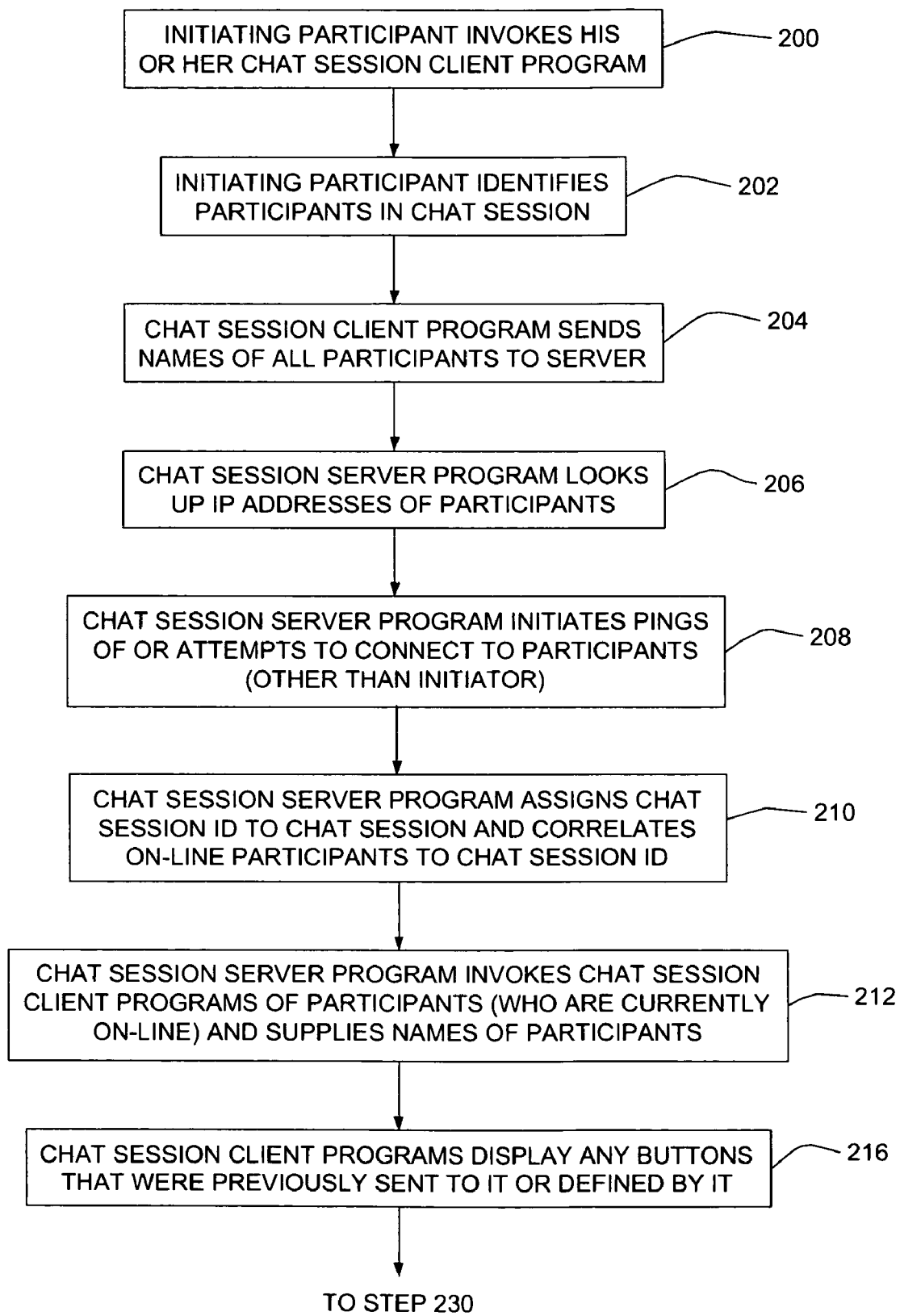
FIGS. 3(A-C) form a flow chart of the chat session client programs and chat session server program of FIG. 1 during a chat session and subsequent use of the information retrieval buttons and innovation of the corresponding agents.
Figure 3B:
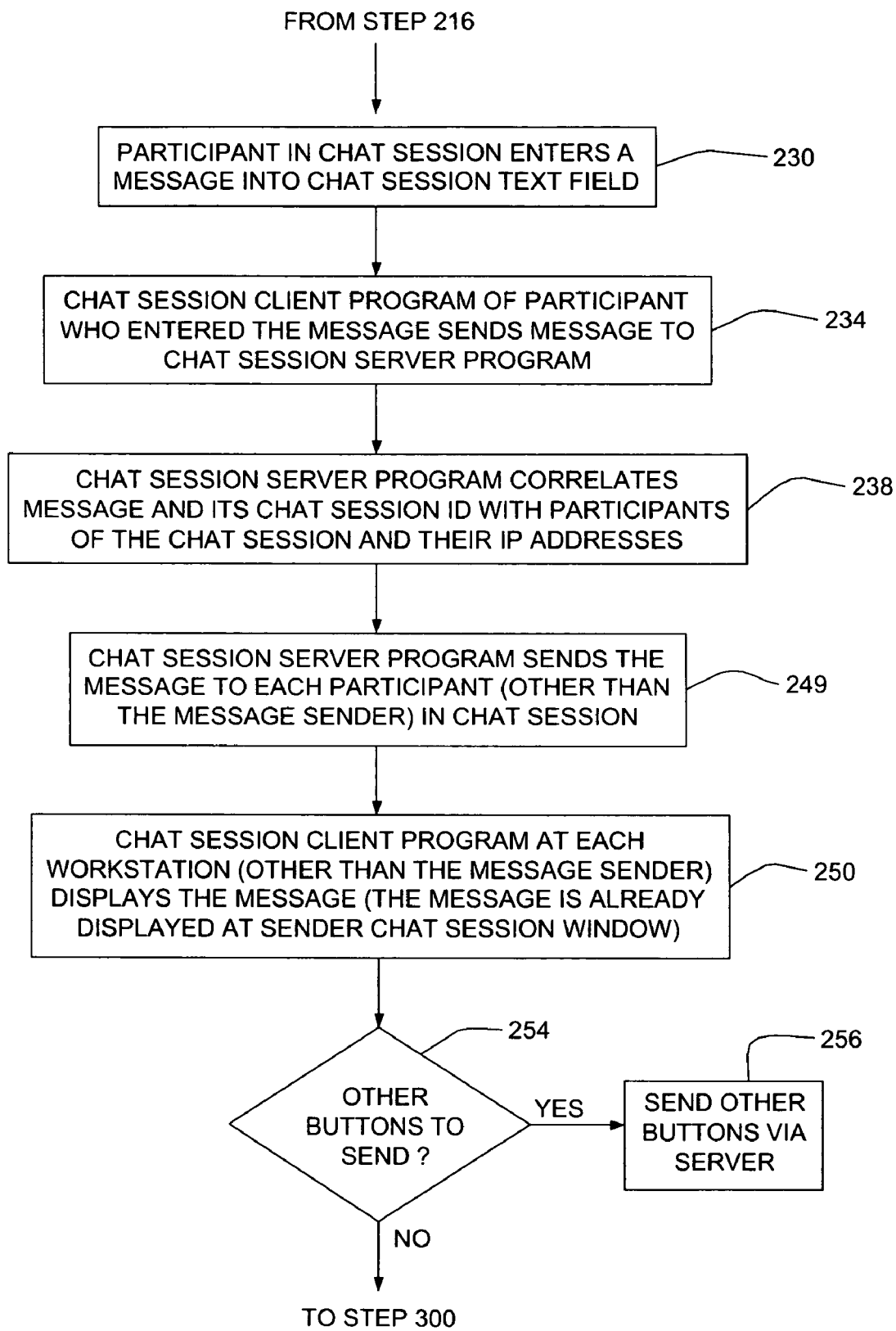
Figure 3C:
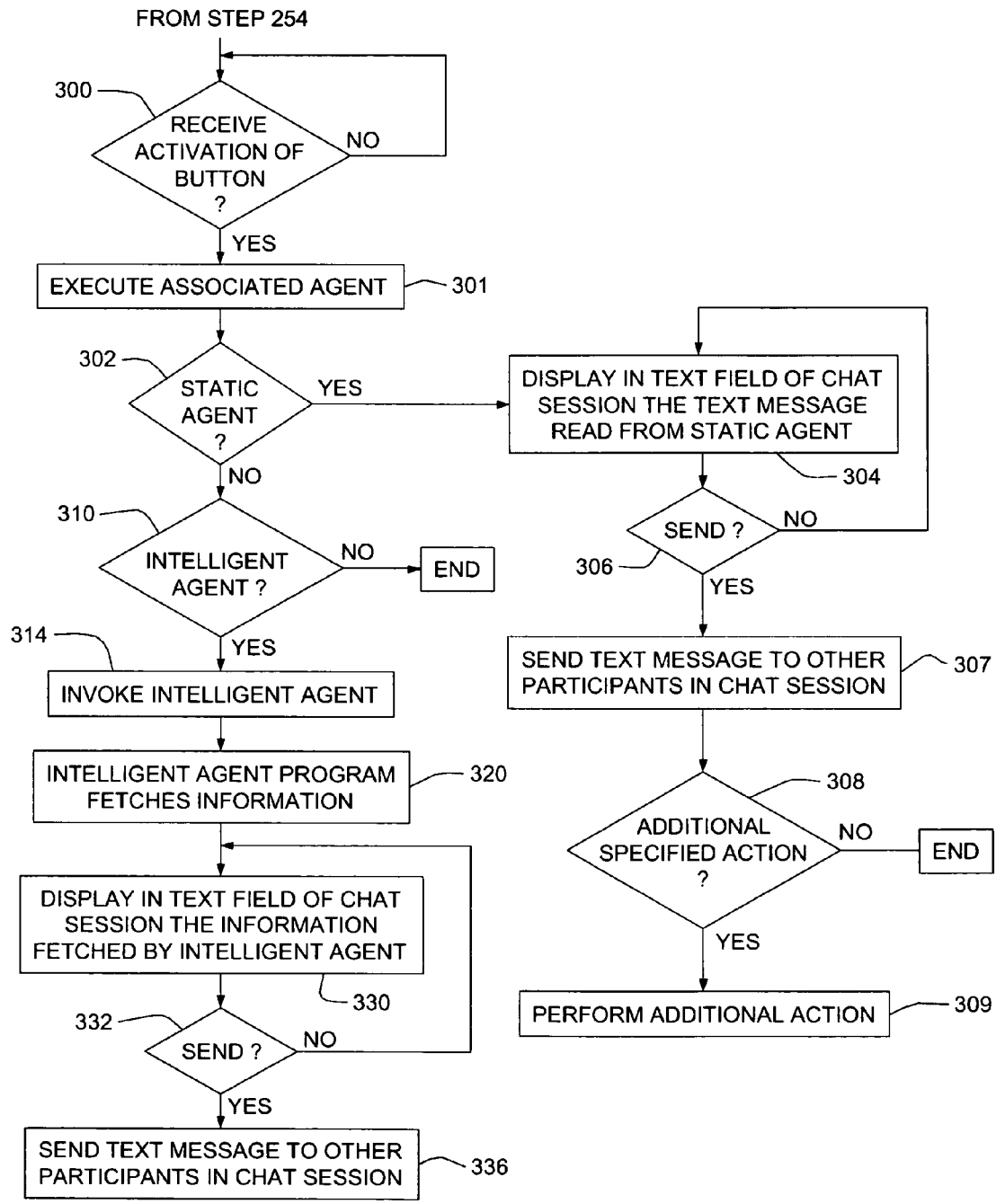

FIGS. 3(A-C) form a flow chart of the function and operation of chat session client programs 40a,b,c,d and chat session server program 50. To initiate a chat session with one or more other people at one or more other workstations, a person invokes his or her chat session client program (step 200) and selects the names of one or more other people to participate in the chat session (step 202). The initiating person can look up the other people in a directory or select the other people from a "buddy" list or other list previously defined by the initiating person. Alternately, the initiating person can select a group icon representing a predefined group of people to participate in a chat session. For purposes of explanation, assume that the user of workstation 12a initiates the chat session and selects the users of workstations 12b,c,d to participate in the chat session. In response, the chat session client program 40a sends the names of the selected people to server 14 (step 204). In response, chat session server program 50 looks up the IP address of the workstation(s) 12b,c,d of the selected people (step 206) and then pings or attempts to connect with the workstation(s) 12b,c,d to determine if the workstation(s) 12b,c,d are currently on line (step 208). Chat session server program 50 then assigns a chat session ID to this chat session, and correlates the names of all the (on-line) participants in the chat session to the chat session ID (step 210). Chat session server program 50 then invokes the chat session client programs 40b,c,d of the workstations 12b,c,d which are currently on line, and supplies these workstations 12b,c,d as well as the workstation 12a of the initiating person with the names of all the people in the chat session (whose workstations are currently on-line) and the chat session ID (step 212). Assume that workstations 12b,c,d are all on-line. (If any of the workstations 12b,c,d was not on-line, then server 50 would not include its user in the chat session.) If one or more buttons and associated agents have been previously received at any or all of the workstations 12a,b,c,d, then the respective workstations 12a,b,c,d display the button upon invocation of the respective chat session client program 40a,b,c,d (step 216).

Next, one of the participants in the chat session, such as the user of workstation 12a, types a message into a text field of the chat session (displayed on a monitor 29a) (step 230). In response, the chat session client program sends the message (and chat session ID) to server 14 (step 234) where chat session server program 50 correlates the chat session ID with the participant(s) in the chat session and the IP addresses of their workstations (step 238). Next, chat session server program 50 sends the message (sent by workstation 12a) to the workstations 12b,c,d of the other participants in the chat session (step 249). In response, the local chat session client programs 40b,c,d display the current message in the chat session window of the respective workstation 12b,c,d (step 250). Other participants in the chat session can similarly enter and send messages to the other participants in the chat session.

If any of the predefined buttons has not yet been sent to any of the participants in the chat session (decision 254), then the creator of the button can send it during the chat session (step 256), and it will be sent as described above in steps 120-150.

Next, one of the participants who has an information retrieval button in his or her chat session window, "presses" or selects the button (decision 300, yes branch). In response, the associated information retrieval program function executes the agent associated with the button (step 301). If the agent is "static" and carries a predefined message (decision 302, yes branch), then the information retrieval program function reads the message from the static agent, and initiates its display in the chat session text field of the one participant (step 304). Next, the one participant can select the "send" option to send this message to the other participants in the chat session via server 14 (decision 306). If so, the chat session client program of the one participant will send this message to the other participants in the chat session, via server 14, in the same manner as if the one participant manually typed the message into his or her chat session text field. If there is an additional action defined for this message, such as start an audio session, begin session encryption, or log user actions (decision 308, yes branch), then the information retrieval program function will perform this additional action as well (step 309). Referring again to decision 302, no branch and decision 310, yes branch where the button is associated with an intelligent agent program, the information retrieval program function invokes the intelligent agent program (step 314). In response, the intelligent agent program fetches the information which it is programmed to fetch, and returns the information to the information retrieval program function (step 320). For example, the intelligent agent program can be programmed to fetch a list of current active processes on the user's workstation. In response to the information provided by the intelligent agent program, the information retrieval program function initiates display of the information in the message field of the chat session of the participant that invoked the intelligent agent program (step 330). Next, the participant can choose to "send" this information to the other participants in the chat session (decision 332). If so (decision 332, yes branch), then the chat session client program of the one one participant will send the information in the message field to the other participants in the chat session, via server 14, in the same manner as if the one participant manually typed the message into his or her chat session message field (step 336).

Figure 4:
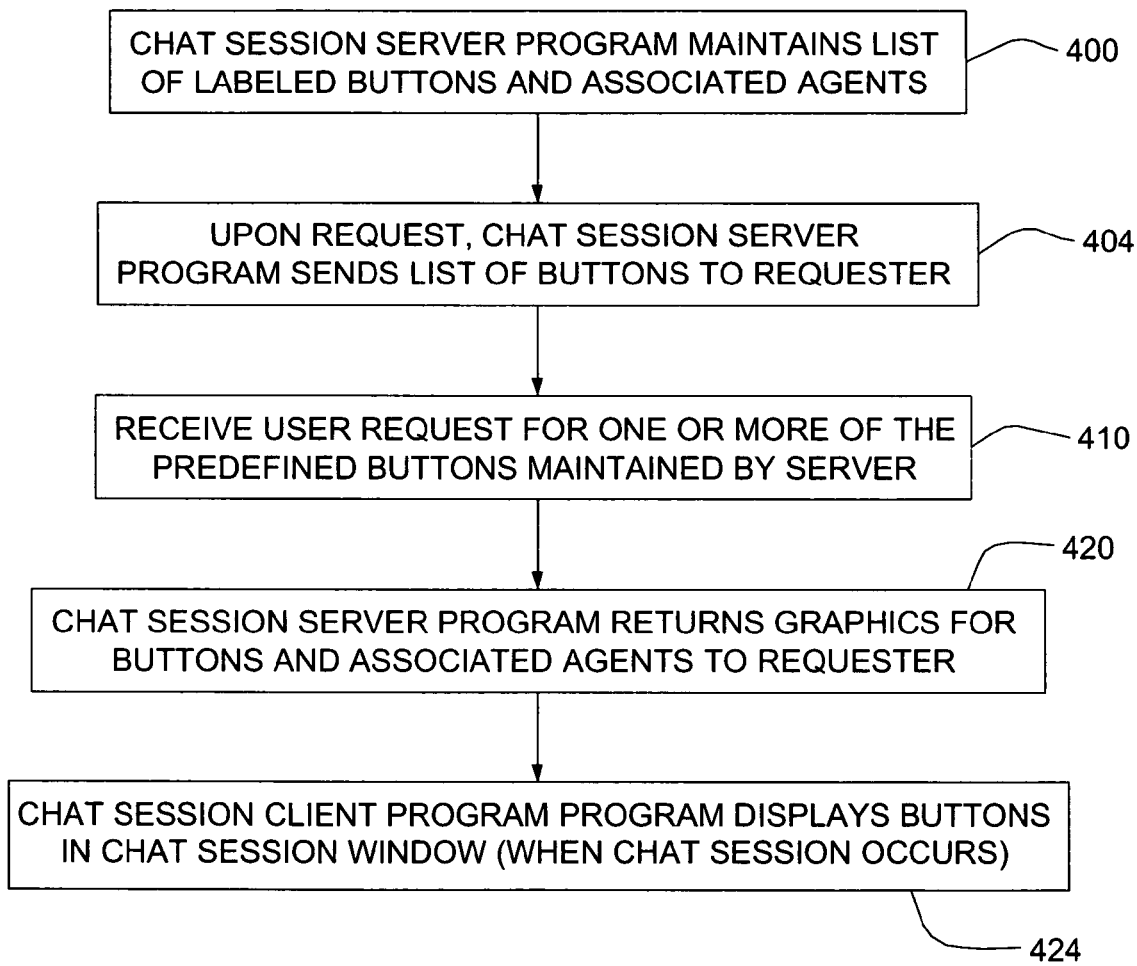
FIG. 4 is a flow chart of an alternate embodiment of the chat session client program of FIG. 1 to obtain information retrieval buttons and corresponding agents from the server computer of FIG. 1.

FIG. 4 is a flow chart of an alternate embodiment of the setup and publish phase for the information retrieval buttons or an additional option for the user. In the embodiment of FIG. 4, chat session server program 50 maintains a list of information retrieval buttons (with labels) and associated static agents (with predefined messages) or intelligent agent programs (programmed to fetch information from the workstation where it executes) (step 400). An administrator at server 14 previously defined these information retrieval buttons and associated agent. Upon request by a user at any of the client workstations 12a,b,c,d to server 14, chat session server program 50 sends the list of information retrieval buttons with labels to the requestor (step 404). Next, the user can select any or all of the information retrieval buttons to be displayed at his or her workstation during a chat session and send the selection to server 14 (decision 410). For any such information retrieval buttons selected by the user, chat session server program 50 returns the graphics for the information retrieval button and the associated agent program (step 420). Next, the chat session client program initiates display of the information retrieval button in current or subsequent chat session windows (step 424).

Figure 5:
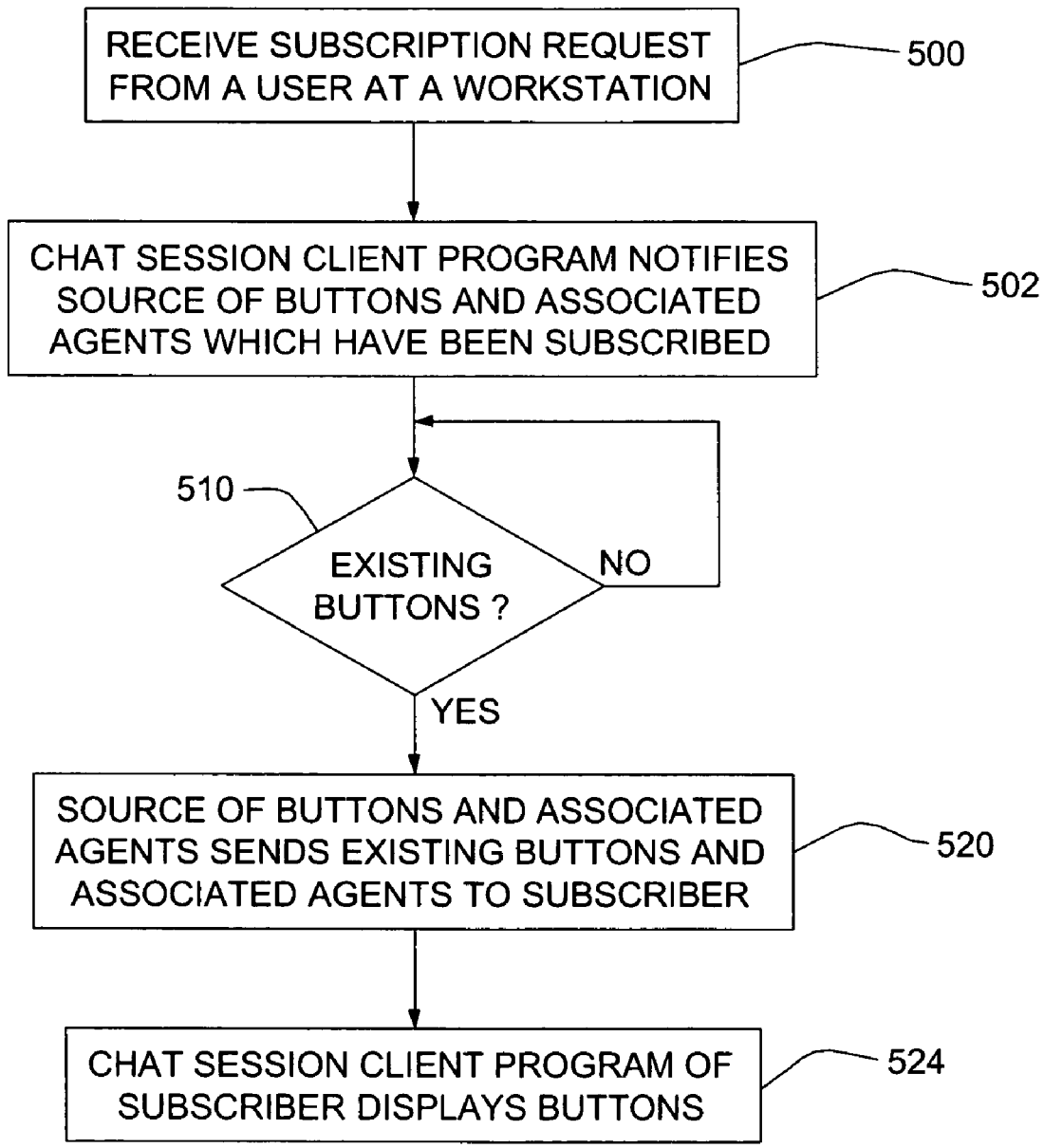
FIG. 5 is a flow chart of another alternate embodiment of the chat session client program of FIG. 1 to obtain information retrieval buttons and corresponding agents from a subscription source.

FIG. 5 is a flow chart of an alternate embodiment of the setup and publish phase for the information retrieval buttons or an additional option for the user. In the embodiment of FIG. 5, a user at any of the workstations 12a,b,c,d subscribes to all or a subset of the information retrieval buttons created by a certain person or userID, such as from a manager or team leader (step 500). The chat session client program of the subscriber notifies the chat session client program of the person or userID who generates the information retrieval buttons (step 502). Then, for any existing information retrieval buttons maintained by the person or userID or subsequently generated by the person or userID (decision 510, yes branch), the chat session client program of the person or userID sends the information retrieval buttons and associated agents to the subscriber (step 520). Next, the chat session client program of the subscriber initiates display of the information retrieval buttons in current or subsequent chat session windows (step 524).

Chat session client programs 40a,b,c,d can be loaded into workstations 12a,b,c,d from computer readable media 43a,b,c,d such as magnetic disk or tape, optical media, DVD, semiconductor memory, memory stick, etc. or downloaded from the Internet 20 via TCP/IP adapter cards 45a,b,c,d.

Chat session server program 50 can be loaded into server 14 from computer readable media 49 such as magnetic disk or tape, optical media, DVD, semiconductor memory, memory stick, etc. or downloaded from the Internet 20 via TCP/IP adapter cards 47.

Based on the foregoing, a system, method and computer program product for facilitating chat sessions have been disclosed. However, numerous modifications and substitutions can be made without deviating from the scope of the present invention. For example, the information exchange between the participant can be audio, video, machine/program executables, machine/program data, plug-ins, and other functional extensions. Therefore, the present invention has been disclosed by way of illustration and not limitation, and reference should be made to the following claims to determine the scope of the present invention.

What is claimed:

1. A method for facilitating a chat session, said method comprising the steps of:
   a first workstation receiving an icon or a definition of the icon and a corresponding intelligent agent program, and in response, said first workstation displaying said icon in a chat session window at said first workstation;
   said first workstation receiving a selection of said icon during said chat session, and in response, said first workstation invoking said intelligent agent program, and in response, said intelligent agent program obtaining BIOS information for said first workstation or information describing computer hardware or computer software within said first workstation and initiating rendering of said information in said chat session at said first workstation; and
   said first workstation, responsive to a request by a participant in said chat session at said first workstation to send said information which is rendered to another participant in said chat session at a second workstation, sending said information which is rendered en route to said other participant in said chat session at said second workstation.

2. The method set forth in claim 1 wherein said icon and said intelligent agent program were received by said first workstation from said second workstation.

3. The method set forth in claim 1 wherein said icon and said intelligent agent program were received by said first workstation from a server to which said participant at said first workstation is subscribed.

4. The method set forth in claim 1 wherein the step of said intelligent agent program obtaining BIOS information for said first workstation or information describing computer hardware or computer software within said first workstation comprises the step of said intelligent agent program obtaining said information describing said software in said first workstation.

5. The method set forth in claim 1 wherein the step of said intelligent agent program obtaining BIOS information for said first workstation or information describing computer hardware or computer software within said first workstation comprises the step of said intelligent agent program obtaining said BIOS information for said first workstation.

6. The method set forth in claim 1 wherein said rendered information is text.

7. The method set forth in claim 1 wherein said rendered information is audio, video or other multimedia information.

8. The method set forth in claim 1 wherein said rendered information is program readable information.

9. A first workstation for facilitating a chat session, said first workstation comprising:

a CPU, computer readable memory and a computer readable storage media;

first program instructions to receive an icon or a definition of the icon and a corresponding intelligent agent program, and in response, store said intelligent agent program on said computer readable storage media or said computer readable memory for execution by said CPU and initiate display of said icon in a chat session window at said first workstation;

second program instructions to receive a selection of said icon during said chat session, and in response, invoke said intelligent agent program to execute on said CPU to obtain BIOS information for said first workstation or information describing computer hardware or computer software within said first workstation, and initiate rendering of said information in said chat session at said first workstation; and third program instructions, responsive to a request by a participant in said chat session at said first workstation to send said information which is rendered to another participant in said chat session at a second workstation, to initiate sending of said information which is rendered to said other participant in said chat session at said second workstation; and wherein said first, second and third program instructions are stored on said computer readable storage media for execution by said CPU via said computer readable memory.

10. The first workstation set forth in claim 9 wherein said icon and said intelligent agent program were received by said first workstation from said second workstation.

11. The first workstation set forth in claim 9 wherein said icon and said intelligent agent program were received by said first workstation from a server to which said participant at said first workstation is subscribed.

12. The first workstation set forth in claim 9 wherein said intelligent agent program is programmed to obtain said information describing said software in said first workstation.

13. The first workstation set forth in claim 9 wherein said intelligent agent program is programmed to obtain said BIOS information for said first workstation.

14. The first workstation set forth in claim 9 wherein said rendered information is program readable information.

15. A computer program product for facilitating a chat session at a first workstation, said computer program product comprising:

a computer readable storage media;

first program instructions to receive an icon or a definition of the icon and a corresponding intelligent agent program, and in response, initiate display of said icon in a chat session window at said first workstation;

second program instructions to receive a selection of said icon during said chat session, and in response, invoke said intelligent agent program to obtain BIOS information for said first workstation or information describing computer hardware or computer software within said first workstation, and initiate rendering of said information in said chat session at said first workstation; and third program instructions, responsive to a request by a participant in said chat session at said first workstation to send said information which is rendered to another participant in said chat session at a second workstation, to initiate sending of said information which is rendered to said other participant in said chat session at said second workstation; and wherein said first, second and third program instructions are stored on said computer readable storage media.

16. The computer program product set forth in claim 15 wherein said icon and said intelligent agent program were received by said first workstation from said second workstation.

17. The computer program product set forth in claim 15 wherein said icon and said intelligent agent program were received by said first workstation from a server to which said participant at said first workstation is subscribed.

18. The computer program product set forth in claim 15 wherein said intelligent agent program is programmed to obtain said information describing said software in said first workstation.

19. The computer program product set forth in claim 15 wherein said intelligent agent program is programmed to obtain said BIOS information for said first workstation.

20. The computer program product set forth in claim 15 wherein said rendered information is program readable information.

* * * * *